(12) United States Patent
Xu et al.

(10) Patent No.: US 11,044,208 B2
(45) Date of Patent: Jun. 22, 2021

(54) SYSTEM AND METHOD FOR MAXIMIZING THROUGHPUT USING PRIORITIZED EFFICIENT BANDWIDTH SHARING

(71) Applicant: Hughes Network Systems, LLC, Germantown, MD (US)

(72) Inventors: Jun Xu, Takoma Park, MD (US); Robert James Torres, New Market, MD (US); John Leonard Border, Middletown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 94 days.

(21) Appl. No.: 15/823,476

(22) Filed: Nov. 27, 2017

(65) Prior Publication Data
US 2019/0166067 A1 May 30, 2019

(51) Int. Cl.
*G06F 15/173* (2006.01)
*H04L 12/927* (2013.01)
(Continued)

(52) U.S. Cl.
CPC ....... *H04L 47/805* (2013.01); *H04B 7/18578* (2013.01); *H04L 41/0896* (2013.01);
(Continued)

(58) Field of Classification Search
CPC ... H04L 47/805; H04L 41/5019; H04L 47/24; H04L 47/783; H04L 47/808; H04L 47/72;
(Continued)

(56) References Cited

U.S. PATENT DOCUMENTS

| 7,061,861 B1 * | 6/2006 | Mekkittikul | ........ H04L 12/2852 370/230 |
| 2004/0015602 A1 * | 1/2004 | Goldhammer | .......... H04L 47/10 709/235 |

(Continued)

FOREIGN PATENT DOCUMENTS

EP 2376558 A2 10/2011

OTHER PUBLICATIONS

International Search Report and Written Opinion dated Feb. 13, 2019 by the International Searching Authority (European Patent Office) in PCT Application PCT/US2018/062497.

*Primary Examiner* — Johnny B Aguiar
(74) *Attorney, Agent, or Firm* — NovoTechIP International PLLC

(57) ABSTRACT

Systems and methods are disclosed, and one includes determining a network resource state, based at least in part on a delay level of the network resource, determining a first priority user demand and a second priority user demand for the network resource, and upon the network resource state meeting a condition, adjusting an allocation of network resource bandwidth to the first priority user and an allocation of network resource bandwidth to the second priority user adjusting. The update of the allocation of network resource bandwidth to the first priority user is based at least in part on a combination of the first priority user demand, the second priority user demand, a first priority user guaranteed bandwidth, and a capacity of the network resource. The update of the allocation of network resource bandwidth to the second priority user is based at least in part on the adjusted allocation of network resource bandwidth to the first priority user.

13 Claims, 7 Drawing Sheets

(51) Int. Cl.
*H04L 12/911* (2013.01)
*H04L 12/917* (2013.01)
*H04B 7/185* (2006.01)
*H04L 12/24* (2006.01)
*H04L 12/26* (2006.01)
*H04L 12/801* (2013.01)
*H04L 12/851* (2013.01)

(52) U.S. Cl.
CPC ...... *H04L 41/5019* (2013.01); *H04L 43/0852* (2013.01); *H04L 43/0876* (2013.01); *H04L 43/16* (2013.01); *H04L 47/24* (2013.01); *H04L 47/29* (2013.01); *H04L 47/70* (2013.01); *H04L 47/76* (2013.01); *H04L 47/783* (2013.01); *H04L 47/808* (2013.01); *H04L 47/821* (2013.01); *H04L 47/828* (2013.01); *H04L 43/0882* (2013.01); *H04L 47/72* (2013.01)

(58) Field of Classification Search
CPC ......... H04L 47/10; H04L 47/70; H04L 47/29; H04L 43/0852; H04L 43/0876; H04L 43/0882; H04L 41/0896; H04L 43/16; H04L 47/828; H04L 47/76; H04L 47/821; H04L 47/5019; H04B 7/18578
USPC ......... 709/223, 224, 226, 235; 370/229, 235
See application file for complete search history.

(56) References Cited

U.S. PATENT DOCUMENTS

| | | | |
|---|---|---|---|
| 2004/0218604 A1* | 11/2004 | Porter | H04L 47/10 370/395.2 |
| 2005/0071471 A1* | 3/2005 | Saenz, III | H04L 47/822 709/226 |
| 2008/0130495 A1* | 6/2008 | Dos Remedios | H04L 47/10 370/230 |
| 2010/0002579 A1 | 1/2010 | Shi et al. | |
| 2010/0322074 A1* | 12/2010 | Nakahira | H04L 47/765 370/235 |
| 2011/0096665 A1* | 4/2011 | McCann | H04L 47/29 370/235 |
| 2012/0140624 A1* | 6/2012 | Denman | H04L 43/0882 370/230.1 |
| 2012/0230195 A1* | 9/2012 | Khivesara | H04L 12/1881 370/235 |
| 2013/0159494 A1* | 6/2013 | Danda | H04L 41/5067 709/224 |
| 2013/0223222 A1* | 8/2013 | Kotecha | H04W 28/0289 370/235 |
| 2015/0049606 A1 | 2/2015 | So et al. | |
| 2015/0288617 A1* | 10/2015 | Dasher | H04L 47/801 709/226 |
| 2017/0126583 A1* | 5/2017 | Xia | H04L 43/0882 |
| 2017/0347236 A1* | 11/2017 | Frusina | H04N 21/41422 |

* cited by examiner

SYSTEM AND METHOD FOR MAXIMIZING THROUGHPUT USING PRIORITIZED EFFICIENT BANDWIDTH SHARING

BACKGROUND

Outroutes in communication networks can carry traffic from both low priority type users and high priority type users, for example, users who have subscribed to a service for a guarantee of bandwidth and a quality of service (QoS). Techniques are applied to ensure the bandwidth and QoS to the high priority user, while allocating remaining bandwidth to low priority users. Such techniques, however, can result in significant idle bandwidth, unusable to either the high priority users or the low priority users. For example, if each high priority user is given dedicated bandwidth, intervals can occur when one or among the plurality do not use that bandwidth. A result can be unusable pieces of fractional capacity not readily usable through current techniques. This can result in inefficient network utilization and lower per user or per user group throughput.

Accordingly, a need exists for high priority users and low priority users to share outroute capacity, with minimal idle capacity, while maintaining guaranteed bandwidths and QoS for high priority users.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, certain details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, to avoid unnecessarily obscuring aspects of the present teachings.

Figure 1:
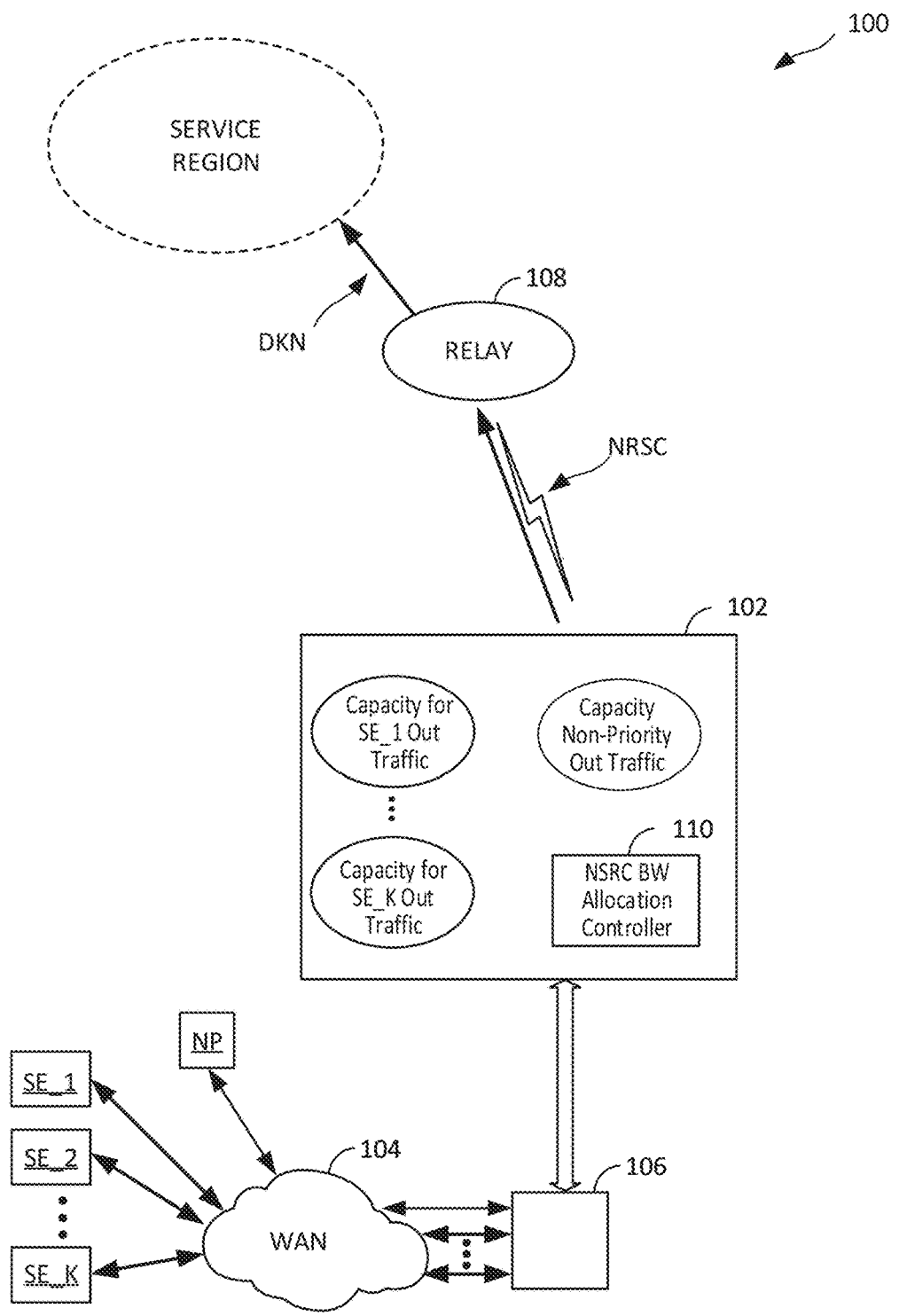
FIG. 1 illustrates a block schematic of one implementation of a system for dynamic sharing and efficient maximizing of utilization of network resource capacity, to first priority traffic and second priority traffic, according to one or more aspects.

FIG. 1 illustrates a functional block schematic of an implementation of a system 100 for dynamic sharing and efficient maximizing of utilization of network resource bandwidth, according to one or more aspects. For purposes of description, "utilization" means a ratio of the sum total actual throughput, both non real time and real time, on the network resource, from all users both high or "first priority," and low or "second priority" to the estimated total bandwidth capacity of the network resource. The illustrated system 100 can include a network resource (NRSC) gateway (GW) 102 configured to receive, for example, through wide area network (WAN) 104 and WAN interface 106, first (high) priority traffic from one or more among K first priority users, referenced as SE_k, k=1 to K, (collectively, "SEs"), and second (low) priority traffic from one or more second priority users, referenced collectively as "NP." It will be understood that the K SEs can be currently active SEs from among a larger population (not explicitly visible in FIG. 1) of SEs. Therefore, the integer K, and the specific priority users forming the K SEs, can vary over time. It also will be understood that "user" can mean a single user or a group of users.

It will be understood that "second priority," as used in this disclosure, is not limited to zero priority or no bandwidth guarantees. For example, second priority users may be provided certain types of bandwidth and QoS specifications. First priority users, though, can possess user-specific subscription plans that can specify, for example, particular guaranteed bandwidths, maximum or peak bandwidths, and specific values or ranges of values for various quality of service (QoS) parameters. It will also be understood that specific priority parameters, e.g., guaranteed reserved bandwidth, maximum or peak bandwidth, and QoS, can differ among different "first priority" users, in accordance with their respective user-specific subscriptions.

Referring again to FIG. 1, the illustrated system 100 is implemented as a satellite network system, and a forward uplink, labelled "NRSC," is an initial segment, extending to a repeater or relay 108, through which SE and NP data destined for terminals in the service region may pass. In the satellite network 100, the uplink in series with the downlink DNK can function as an outroute. A satellite network outroute is one example of a network resource for which bandwidth capacity can be allocated through systems and methods according to various aspects of this disclosure. The outroute example of a network resource, though, is not intended as any limitation on implementations or practices according to the disclosed aspects.

The NRSC GW 102 can include a NRSC bandwidth (BW) allocation controller 110, which can be configured to receive or determine various NRSC conditions and metrics. In an implementation, the reception or determination of one or more of the various NRSC conditions and metrics can be periodic, for example, according to a network resource clock (not explicitly visible in FIG. 1). The NRSC metrics can include, for example, a NRSC delay level and a NRSC utilization level. The NRSC BW allocation controller 110 can be further configured to determine an NRSC state, periodically or aperiodically, based at least in part on the obtained NRSC delay level (DL) and determined NRSC utilization level (UL). In an implementation of system 100, the NRSC BW controller 110 may be implemented in, or as added functionality of a code rate organizer (CRO). The determined NRSC state can include various congestion states, for example, a non-congested state, a fully congested state, and at least one intermediate congestion state. The fully congested state can be established, in one implementation, by the NRSC DL relative to a given delay threshold. In such an implementation, the fully congested state will be referred to as a "delay-congested" state. Other congestion conditions can be defined according to the NRSC DL and delay threshold in combination with the NRSC UL relative to one or more given utilization thresholds.

The NRSC BW allocation controller 110 can be configured to allocate NRSC bandwidth to each SE_k, as CE_k, for k=1 to K, and allocate NRSC bandwidth to the NP, as "CC." The allocations can be updated at time increments "t," therefore the allocated bandwidths will be referenced as CE_k(t), k=1 to K (collectively, "CEs"), and CC(t). Regarding the duration or period of t, values can be application-specific. Example factors that may be considered determining a specific t, or range oft, can include statistics of bandwidth demand changes, various subscription-specified QoS levels, and system and user tolerance to intermittent degradation, e.g., when demand change rate exceeds the bandwidth partitioning update period, i.e., the period of t (as well as the multiple-period updating process).

The NRSC BW allocation controller 110 can be configured to periodically apply, conditional upon the determined NRSC congestion state, an update process to CE_k(t), k=1 to K, and CC(t). These are described in greater detail in reference to FIG. 2 and other of the appended figures.

Figure 2:
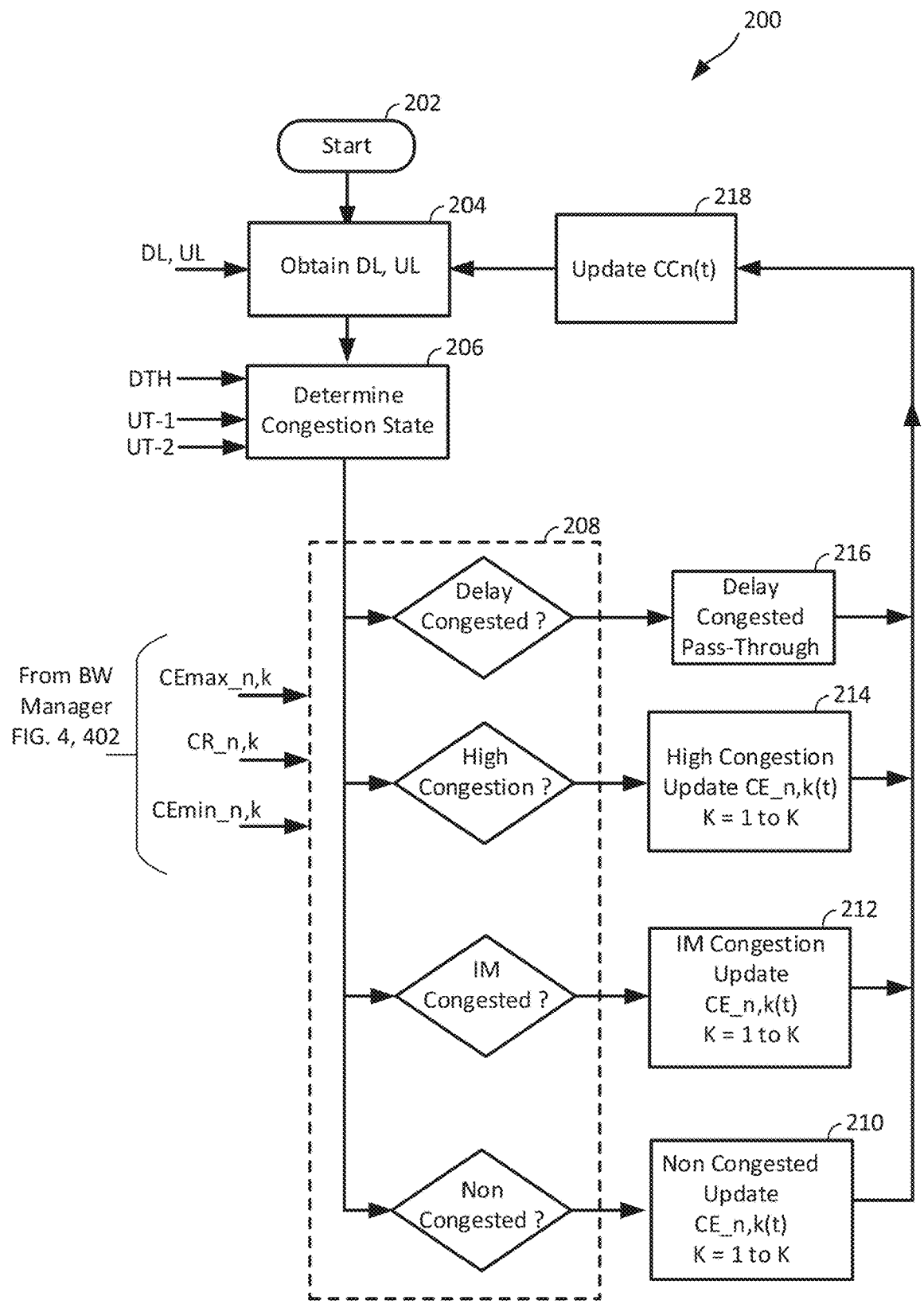
FIG. 2 illustrates a logic flow of example operations in one process within methods, according to one or more aspects, providing dynamic sharing and efficient maximizing in utilization of network resource capacity, to first priority traffic and second priority traffic.

FIG. 2 illustrates a logic flow 200 of example operations in one process within methods, according to one or more aspects, for dynamic sharing and efficient maximizing of utilization of network resource bandwidth, to first priority traffic and second priority traffic. Examples according to FIG. 2 operations will be described in reference to FIG. 1. Description of operations in the flow 200 will refer to real-time as "RT" and non-real-time as "NRT." The flow 200 assumes that prior to the start 202, the NRSC bandwidth allocation controller 110 is provided with values for the following bandwidths, for each of the K SEs.

CR_k—a reserved BW for SE_k
CEmax_k—a maximum BW for SE_k, where CR_K≤CMX_k; and
CEmin_k—a minimum BW for SE_k.

The flow 200 also assumes the NRSC bandwidth allocation controller 110 periodically determines, or is provided with, the following NRSC condition metrics:

AE_k(t)—actual throughput for SE_k at time t;
CNRT—most recent estimated total NRT bandwidth of the NRSC;
DL—most recent measured or estimated delay for the NRSC; and
UL—most recent measured or estimated utilization level for the NRSC.

Figure 3:
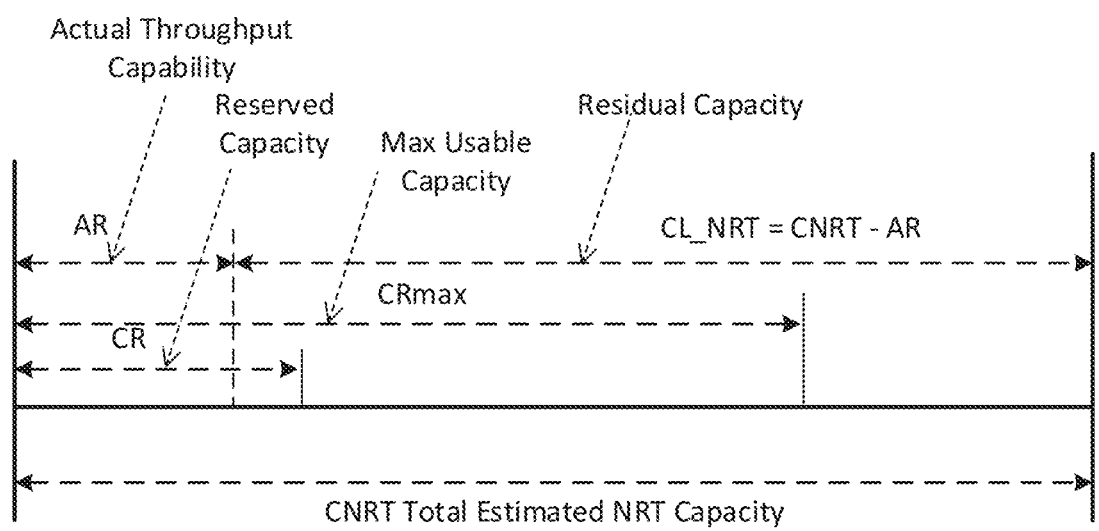
FIG. 3 illustrates portions of various bandwidth allocations applied in processes and methods for dynamic sharing and efficient maximizing of utilization of network resource capacity, to first priority traffic and second priority traffic, according to one or more aspects.

As an option, the NRSC BW allocation controller 110 can be configured with, or provided a minimum BW allocation for NP, and will be referred to as "CC_min." Optionally, if CC_min is provided, it can be configured with a default value of zero FIG. 3 graphically represents a hypothetical example of AE, CR, CMax, CNRT and a "residual capacity."

Referring again to FIG. 2, the example operations in the flow 200 will assume that, prior to t at 202, the NRSC BW allocation controller 110 has been configured with, or has run-time access to a delay threshold, and to a first and a second utilization threshold. For purposes of description, the delay threshold will be referred to as "DTH," and the first and second utilization threshold will be referred to as "UT1" and "UT2," respectively. UT1 is assumed as the smaller among UT1 and UT2. In one implementation, the NRSC BW allocation controller 110 can be configured to detect, based on UT1 and UT2 in combination with DTH, two intermediate congestion states of the NRSC, in addition to the non-congested state and delay congested state. The least congested of the two, which will be referred to as the "intermediate congestion state," is the recent utilization level being concurrently higher than UT1 (the smaller of the two) lower than UT2, concurrent with the delay level being less than DTH. The higher of the two intermediate congestion states is the utilization level being greater than UT2, concurrent with the delay level being less than DTH. This can be referred to as the "higher congestion state."

A run-time instance of the flow 200 can start at 202, at an arbitrary t, then proceed to 204 to obtain the NRSC's DL and UL. It will be understood that "obtain," in the context of "obtain the NRSC's DL and UL," encompasses NRSC DL and NRSC UL having been previously supplied to the NRSC BW allocation controller 110. The flow 200 can proceed from 204 to 206, where operations can be applied to determine the NRSC congestion state, based at least in part on the obtained DL and UL. As described above, it is assumed NRSC BW allocation controller 110 is configured to apply two utilization thresholds, e.g., UT1 and UT2. Therefore, operations at 206 will detect the NRSC state as the non-congested state, intermediate congestion state, high congestion state, or delay congested state, according to the following:

delay congested state—NRSC DL exceeding DTH,
high congestion state—NRSC DL less than DTH, concurrent with NRSC UL greater than UT2, the higher of the two utilization thresholds,
intermediate congestion state—NRSC DL less than DTH, concurrent with NRSC UL being concurrently greater than UT1 and less than UT2, and
non-congested state—NRSC DL less than DTH, concurrent with NRSC UL less than UT1

Having the NRSC congestion state determined at 206, the flow 200 proceeds to logic decision 208 which routes the flow 200 to one of a plurality of different CE_k(t) update processes, each corresponding to a different NRSC congestion state determined at 206. Each of the different CE_k(t) update processes is configured to adjust allocation of bandwidth in a manner that, at the present congestion state determined at 206, maximizes utilization and efficiency in sharing NRSC bandwidth, among and between priority and non-priority users. FIG. 2 illustrates the flow 200 assuming a configuration as described above, namely, a breakdown into four congestion states, and a corresponding four congestion state-specific CE and CC update processes. The determination at 206 of the NRSC congestion state, and the application of the appropriate updating of CE_k(t), can be performed by the NRSC BW allocation controller 110. The update process can be applied in K iterations, generating CE_k(t+1), for k=1 to K. FIG. 2 illustrates as its configured set of NRSC bandwidth allocation update processes, a set four processes, each corresponding to one of the four congestion states in the example above. More specifically, the set can include a non-congested NRSC BW allocation update process 210, an intermediate congestion NRSC BW allocation update process 212, a high congestion NRSC bandwidth allocation update process 214, and a delay congested NRSC state update process 216. In one implementation of the system 100 and the flow 200, after the update process among 210, 212, 214 and 216 is performed, the flow 200 can proceed to 218 and update CC(t), based at least in part on CE_k(t+1), k=1 to K.

In one implementation of the NRSC BW allocation controller 110, operations in the NRSC non-congested state update process 210 can include updating to CE_k(t+1) by increasing CE_k(t), by an amount based at least in part on CE_k(t), in relation to the SE_k's reserve bandwidth, CR_k. Such operations, in one specific configuration, can be according to the following Equation (1):

$$CE\_k(t+1)=\min\{CE\max\_k,\max[C\_k,CE\_k(t)*(1+\Delta\_UP1)]\}, \quad \text{Eqn. (1)}$$

wherein $\Delta\_UP1$ is configuration parameter.

Referring to Equation (1), the larger the $\Delta\_UP1$ value the greater the single update adjustment increment of the CE_k (t) values. The specific value of $\Delta\_UP1$ can be application-specific, but as can be seen from the Equation (1) representation, factors can include NRSC update period, t.

In one implementation, operations in the NRSC intermediate-congested state update process 212 can include updating to CE_k(t+1) by increasing CE_k(t), by an amount based at least in part on CE_k(t), in relation to the SE_k's reserve bandwidth, CR_k. This differs from the non-congested state CE_(t) update process 210, which uses a constant increment, $\Delta\_UP1$. Operations at 212, in one specific configuration, can be according to the following Equation (2):

$$CE\_k(t+1)=\min\{CE\max\_k,\max[CR\_k,CE\_k(t)+\Delta\_CE\_k)]\}, \quad \text{Eqn. (2)}$$

Determination of $\Delta\_CE\_k$ can be based, at least in part, on the total throughput of the SE_k traffic on the NRSC, which for purposes of description, will be referred to as AE_k(t), in combination with the summed total throughput (ATTL(t))—of all the SE_k traffic and can be further based on ratio of the SE_k reserve bandwidth, CR_k, to the sum total of all the priority user SE reserve bandwidths, i.e., the sum of CR_k, for k=1 to K. In one implementation, operations applied at 212 for determining $\Delta\_CE\_k$ can be according to the following Equations (3)-(5), or equivalents thereof. It will be understood Equations (3)-(5) are a breakdown for purposes of segmenting the description, and are not intended as any limitation as to a specific sequencing of operations in a processor implementation. It will also be understood that operations at 212 can be configured such that specific values, for each of the variables and parameters appearing in Equations (3)-(5), may not be stored, or generated, in an isolated form.

$$ATTL(t) = \sum_{k=1}^{K} AE\_k(t) \quad \text{Eqn. (3)}$$

$$\Delta CE\_UP = ATTL(t) \cdot \Delta\_UP2 \quad \text{Eqn. (4)}$$

$$\Delta CE\_k = \Delta CE\_UP \cdot \frac{CR\_k}{\sum_{k=1}^{K} CR\_k}, \quad \text{Eqn. (5)}$$

where $\Delta\_UP2$ is a configuration parameter.

As is apparent from Equation (5), the larger the reserved bandwidth, CR_k, the larger is the $\Delta\_CE\_k$ increase applied by the updating process.

Regarding the NRSC high congestion allocation update process 214, in one implementation, operations at 214 can include updating to CE_k(t+1) by a decrease of CE_k(t), the decrease being based at least in part on the CE_k(t) and CR_k. In one implementation, operations of this high congestion state updating of SE(k) can be according to the following Equation (6):

$$CE\_k(t+1)=\min\{CE\max\_k,\max[CR\_k,CE\_k(t) \cdot (1-\text{Step\_Down})]\} \quad \text{Eqn. (6)}$$

The variable "Step_Down" can be based, at least in part, on a ratio of the arithmetic difference between the NRSC DL and the delay threshold DTH, i.e., the amount that DL exceeds DTH, to a flow control period TF. In one implementation, values used at 214 for determining Step_Down can be according to the following Equations (7) and (8):

$$\text{Delay\_Diff}=(DL-DTH)/TF \quad \text{Eqn. (7)}$$

$$\text{Step\_Down}=\min(\Delta\_\text{Down},\text{Delay\_Diff}), \text{ where} \quad \text{Eqn. (8)}$$

The variable $\Delta\_\text{Down}$ is a configuration parameter.

Referring to the description above of Step_Down and its determination, it can be seen that its values do not require re-calculation for each K SE_k value.

Regarding the delay congested state updating operations at 216, in an aspect, NRSC BW allocation controller 110, and hence the flow 200, can be configured to leave CE_k(t), k=1 to K, and CC(t) unchanged if the NRSC is in the delayed congested state. For this configuration, logic block 216 can be a pass through and, since CC(t) is updated based on the CE(t) update, the flow 200 can return to 204, where NRSC BW allocation controller 110 can obtain DL and UL values, whereupon the above-described flow 200 process can repeat.

As described, general operations according to the flow 200 will include determining the NRSC congestion state at 206 and then, via 208, proceeding to the CE_k(t) update process of one among 210, 212, 214, or 216. The selected update process can then be repeated as a k iteration loop to generate CE_k(t+1), for k=1 to K, whereupon the flow 200 can proceed to 218 and update CC(t).

Referring to block 218, as described above, the NRSC BW allocation controller 110 can be configured to update CC(t) based at least in part, on the updating of the CEs. In one implementation, the specific operations at 218 can be according to the following Equation (9):

$$CC(t+1)=\max\{CC\_\min,CNRT-\rho C^* \sum_{k=1}^{K}[\min[AE\_k(t),CE\_k(t)]]\}, \quad \text{Eqn. (9)}$$

where,
CC_min is a given minimum value of CC,
CNRT is an estimated non real-time capacity of the NRSC, and
$\rho C$ is a given scaling factor.

Each value AE_k(t), as described above, is a total throughput on NRSC associated with the kth of the K first priority sources, SE_k, k=1 to K. In one alternative implementation, the NRSC BW allocation controller 110 operations at 218 can be according to the following Equation (10):

$$CC(t+1)=\max[CC\_\min,CNRT-E[AE\_\text{total}],CNRT-\sum_{k=1}^{K}CE\_k(t+1)], \quad \text{Eqn. (10)}$$

where,
E[AE_total] is a running average based on ATTL(t) and ATTL(t−1).

An example generating of E[AE_total] can be according to Equation (11):

$$E[ATTL(t)]=\alpha_E \cdot ATTL(t)+(1-\alpha_E)E[ATTL(t-1)] \quad \text{Eqn. (11)}$$

where,
$\alpha_E$ is a configuration parameter.

Technical features of update processes using the flow 200 can include, but are not limited to:
through all traffic and NRSC conditions, each SE_k reserved BW, CR_k, can be guaranteed;
during intervals that the NRSC is in its uncongested state, for each SE_k
if the NRSC utilization is low, CE_k can be increased by the NRSC BW allocation controller 110, as demanded, up to the SE_k maximum BW, CEmax_k, and
if the NRSC utilization is high, the NRSC BW allocation controller 110 can assign BW to SE_k to meet its actual throughput;
if the NRSC is close to congestion (i.e., the above described "high congestion" state) with high overall demand from both SEs and the NP, the NRSC BW allocation controller 110 can reduce all SEs' assigned BW, allowing the NP extra BW to meet the NP demand; and
during intervals where the NRSC is congested, NP may compete with the SEs, up to NP having all BW of the NRSC beyond the SEs' reserved BW.

The FIG. 1 system 100 shows a single NRSC GW 108, having a respective NRSC BW allocation controller 110. One alternative system, and method performed thereon, can provide dynamic distribution of priority traffic across multiple NRSCs (e.g., multiple outroutes), for efficient sharing by first priority and second priority traffic, and providing a maximizing of utilization of bandwidth on each of the multiple NRSCs.

Figure 4:
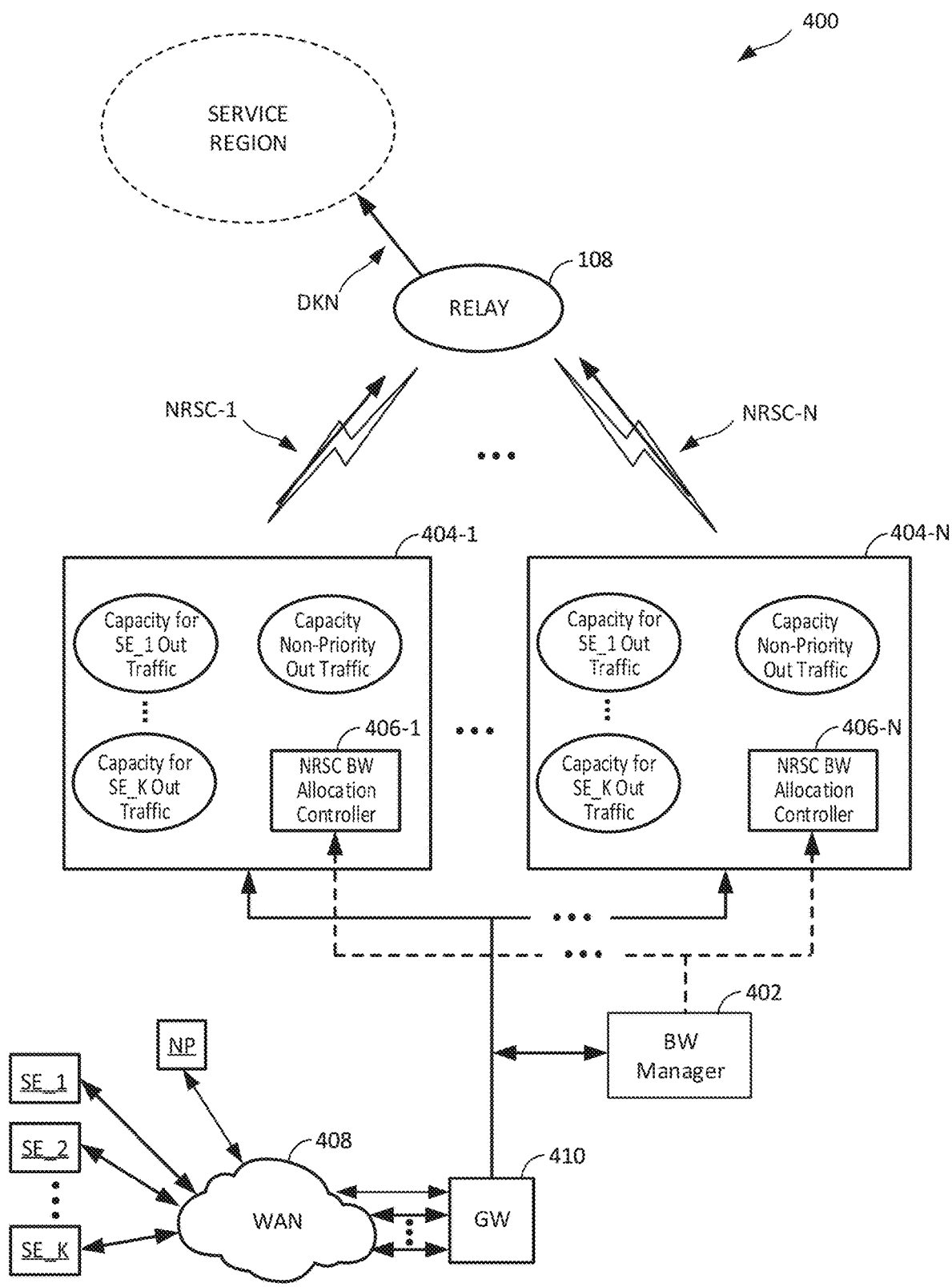
FIG. 4 illustrates a block schematic of one implementation of a system for dynamic distribution of first priority traffic across multiple network resources, for efficient sharing and maximizing utilization of capacity on each of the multiple network resources to first priority traffic and second priority traffic, according to one or more aspects.

FIG. 4 illustrates a block schematic of one implementation of a system 400 for providing dynamic distribution of traffic from multiple priority sources, across multiple NRSCs and, on each NRSC, providing a sharing and maximizing of utilization of bandwidth, to first priority and second priority traffic, according to one or more aspects. The illustrated system 400 can include a bandwidth (BW) manager 402 in communication with N network resource GWs, labeled 404-$n$, for n=1 to N (collectively, "NRSC GWs 404"), each NRSC GW 404 being a gateway to a single NRSC (e.g., a satellite system single outroute), among N NRSCs, NRSC-n, for n=1 to N (collectively, "NRSCs"). Visible in FIG. 4, as representative examples, are a first NRSC GW 404-1 and an Nth NRSC GW 404-N, to a first NRSC-1 and an Nth NRSC-N, respectively. Each of the N NRSCs 404-$n$ can include a corresponding NRSC BW allocation controller 406-$n$, n=1 to N (collectively "NRSC BW allocation controllers 406"), each configured to allocate or partition its corresponding $n^{th}$ NRSC bandwidth for sharing and utilization by a plurality of first priority users, and by a second priority user. The NRSC BW allocation controllers 406 can be generally configured, for example, according to the above-described NRSC BW allocation controller 110. The FIG. 4 priority users are the above-described first priority users SE_k, k=1 to K, and the second priority user is the above described NP. In an implementation, the K first priority users SE and the second priority user NP can interface to a WAN 408, for example, the Internet, to which the N NRSC GWs 404 can connect through a WAN gateway 410.

The BW manager 402 can be configured to store (or have other access to) and to apply N different selection or enablement rules, one for each $n^{th}$ of the N NRSC BW allocation controllers 406, which defines or establishes the controller 406's corresponding K first priority users, SE_k, k=1 to K. It will be understood that the quantity K is not necessarily the same for every NRSC GW 404. It will also be understood that the particular SEs that comprise SE_k, for k=1 to K can be different among the different NRSC GWs 404. In a related aspect, the BW manager 402 can be configured to identify, for each SE having access to any one or more of the NRSC GWs 404, a listing of all NRSC GWs 404 it has access to. For purposes of description, the list will be referred to as the SE's "enabled NRSC list." As will be described in greater detail later, the BW manager 402 can be configured to use, for each SE sending priority traffic, the enabled NRSC list for purposes of optimally distributing that traffic across its enabled NRSCs.

The BW manager 402 can be further configured to provide, to each $n^{th}$ of the N NRSC BW allocation controllers 406, a corresponding K priority reserved bandwidths (CR_n, k), k=1 to K, and K priority maximum bandwidths (CEmax_n,k), k=1 to K. Each of the N NRSC BW allocation controllers 406 can also be provided a delay threshold and at least one utilization threshold. One example can be the above described delay threshold DTH and the above-described first and second utilization thresholds UT1 and UT2. It will be assumed, for purposes of describing example operations, that all of the N NRSC BW allocation controllers 406-$n$ use the same delay threshold(s) and utilization threshold(s). Accordingly, DTH, UT1 and UT2 are not assigned the index "n." This is not a limitation, as implementations can provide different thresholds to different N NRSC BW allocation controllers 406.

Each of the N NRSC BW allocation controllers 406 can be configured to obtain an NRSC delay level (DL_n) and an NRSC utilization level (UL_n) of its corresponding NRSC-n and, based thereon, determine a congestion state of that $n^{th}$ NRSC. One example determination can be among the four congestion states described in reference to FIGS. 1 and 2. Each of the N NRSC BW allocation controllers 406-$n$, n=1 to N can be further configured to maintain, and update at intervals of t, a set of K priority bandwidth allocations, CE_n, k(t), k=1 to K, for its K first priority users SE, and a second priority bandwidth allocation, CC_n(t), for the second priority user NP. In one example configuration, each of the N NRSC BW allocation controllers 406 can be configured to update CE_n,k(t) to CE_n,k(t+1) and update its CC_n(t) to CC_n(t+1), in accordance with the FIG. 2 flow 200.

In an aspect, the BW manager 402, by identifying the K SEs, and providing CR_n,k, CEmax,n,k and CEmin to each of the N NRSC BW allocation controllers 406, enables N NRSC BW allocation controllers 406 to operate independently, dynamically partitioning their respective NRSCs, without requiring knowledge of the other N−1 NRSC BW allocation controllers 406. Such operations can include conditionally updating, at time increments t, CE_n,k(t) for each of its K priority users, to CE_n,k(t+1). These operations can, as described in reference to FIG. 2, be based at least in part on CE_n,k(t) and CR_n,k. Each of the NRSC BW allocation controllers 406, upon completing that update, can update its corresponding CC_n(t) to CC_n(t+1), based at least in part on a summation of CE_n,k(t+1), for k from 1 to K, as described above.

In one implementation, the BW manager 402 can be configured to periodically update its enablement rule. The BW manager 402 can be further configured to update CR_n,k, CEmax_n,k and CEmin_n,k to each of the N NRSC BW allocation controllers 406. The period can be referred to as "the NRSC distribution update period." Preferably, but not necessarily, the NRSC distribution update period can be significantly longer than the NRSC partition update period, t. One illustrative, non-limiting, example of "significantly longer" can include, but is not limited to, the NRSC distribution update period being approximately 10 times to approximately 30 times the NRSC partitioning period.

In an implementation, system 400 can be configured to provide, in combination with other disclosed features and aspects, a real-time (RT) traffic adjusted reserve BW and maximum BW. The RT adjusted reserve BW can provide, for example, adjustments for, and efficient accommodation of real time traffic, within a dynamic NRSC BW allocation and multiple NRSC distribution. More specifically, in various applications, there can be a preference that reserved bandwidth for first priority users on each NRSC, i.e., CR_n,k, for n=1 to N and k=1 to K, accommodates both RT traffic and non-real-time (NRT) traffic, and not just NRT traffic. In an aspect, the BW manager 402, or another resource available to the system 400, can be configured to provide such accommodation by processes that include a particular decreasing of a first priority user's NRT reserved bandwidth (CR_n,k), if that user's RT traffic exceeds a threshold of its total traffic. One example configuration can include, among other operations, determination of its "instant real-time portion" or "instant RT portion."

Implementation of determining the instant RT portion can include configuring the BW manager 402 to periodically obtain, at increments of t, for each SE, a measured overall real-time traffic, VR_n,k(t), on each of the N NRSCs. The instant RT portion can then be determined as a ratio of VR_n,k(t) to the priority's user's non-adjusted reserve bandwidth, CR_n,k. Operations can, for example, be according to Equation (12):

$$\eta RT\_n, k(t) = \frac{VR\_n, k(t)}{CR\_n, k(t)} \qquad \text{Eqn. (12)}$$

where $\eta RT\_n,k(t)$ is the instant RT portion, on NRSC-n, from SE_k.

It can be seen that the instant RT portion can be larger than integer 1 when the RT traffic exceeds CR_n,k. The BW manager 402 can be configured to utilize the instant RT portion, for each of the N NRSCs, to determine which of the SEs enabled for that NRSC is putting on the NRSC a level of RT traffic such that its instant RT portion is greater than 1 or, more generally, is greater than TN, which can be less than 1, equal to 1, or greater than 1. TN can be a configuration parameter. The BW manager 402 can be configured to adjust each of such SE's reserved bandwidth on that NRSC. One implementation can include configuring the BW manager 402, or another resource, to perform adjustment operations as illustrated by the following Equations (13) and (14), for each $\eta RT\_n,k(t)\_TN$:

$$\text{Rev}[CE max\_n,k(t)] = \max\{CE min\_k, [CE max\_n,k(t) - g\_k \cdot VR\_n,k(t)]\} \qquad \text{Eqn. (13)}$$

$$\text{Rev}[CR\_n,k(t)] = \max\{CE min\_k, [CR\_n,k(t) - g(k) \cdot VR\_n,k(t)]\} \qquad \text{Eqn. (14)}$$

CEmin_k is a minimum BW that can be reserved for SE(k), and g_k is a coefficient that can allow selective treating of RT traffic. CEmin_k can provide, for NRT traffic from SE on any of N NRSCs, a minimum BW on that NRSC, in instances where RT traffic consists of a significant amount of the SE's reserved bandwidth, CR_n,k, on that NRSC. Regarding g_k, a default value of g(k) can be set at integer 1, to indicate that RT traffic can be counted when reserving BW if the RT portion is larger than a threshold. For purpose of description, the threshold will be referred to as "GT." In an aspect, g can be set to zero, to indicate that RT traffic will not be counted when reserving BW if the RT portion is larger than GT. The value of GT can be application-specific, and can be readily determined, for the application, by a person of ordinary skill upon reading this disclosure.

In one implementation, both the threshold test, $\eta RT\_n,k(t) \geq TN$, and each of Equations (13) and (14) can use an averaged $\eta RT\_n,k(t)$, $EMA[\eta RT\_n,k(t)]$. The average can be determined, for example, by operations according to Equation (15):

$$EMA[\eta RT\_n,k(t)] = \alpha RT \cdot \eta RT\_n,k(t) + (1 - \alpha RT) EMA[\eta RT\_n,k(t-1)] \qquad \text{Eqn. (15)}$$

where, $\alpha RT$ is a configuration parameter.

The averaging interval "t" in operations such as Equation (15) is not necessarily the same as the period or interval applied by the NRSC BW allocation controllers 406. Example ranges of the averaging interval can include 100 milliseconds (ms), multiples of 100 ms, and ranges extending above, between and beyond these examples. Values, and ranges of values, for $\alpha RT$ can be application specific. Examples values and ranges can include 0.01, but can also include ranges below and above that example.

Figure 5:
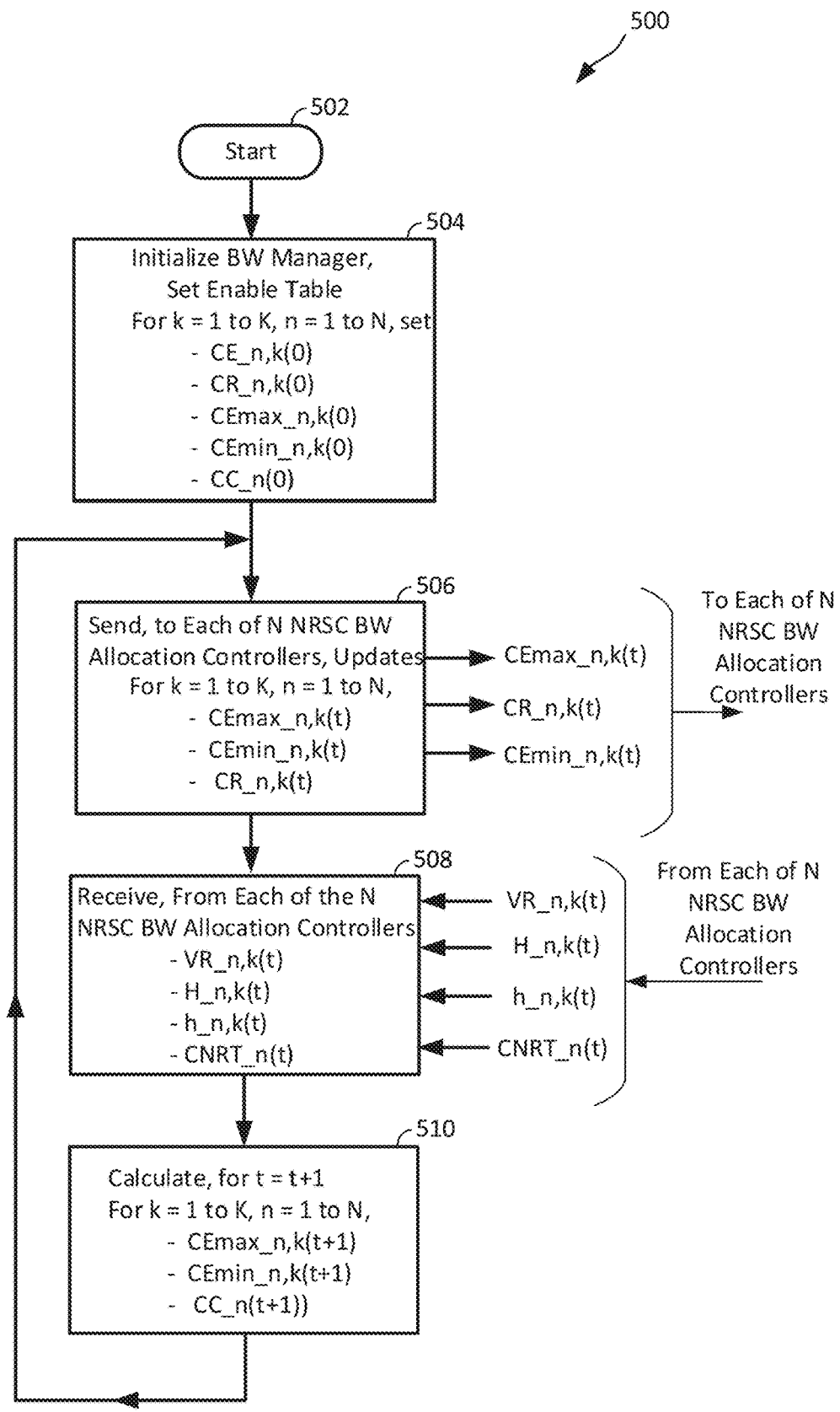
FIG. 5 illustrates a logic flow of example operations in one process within methods, according to one or more aspects, for dynamic distribution of first priority traffic across multiple network resources, for efficient sharing and maximizing utilization of capacity on each of the multiple network resources, to first priority traffic and second priority traffic, according to one or more aspects.

Example operations in processes for optimized distributing of SE priority traffic across the FIG. 4 multiple NRSCs, and dynamic partitioning of each NRSC's BW, will be described in reference to FIG. 5. FIG. 5 illustrates a logic flow 500 of example operations in one process within methods according to one or more aspects. Assuming a start-up instance, flow 500 can begin at an arbitrary start 502 and proceed to 504 where the BW manager 402 can perform an initialization. The initialization operations can include initializing its enablement rules, which can designate, or define, for each of the N NRSC BW allocation controllers 406, which of the first priority users SE are enabled to access that controller 406. One example of such initializing can form the enablement rule according to an eligibility matrix, such as the following Equation (16), or an equivalent thereof:

$$E_{N \times K} = \{e_{n,k}\} = \begin{bmatrix} e_{11} & \cdots & e_{1K} \\ \vdots & \ddots & \vdots \\ e_{N1} & \cdots & e_{NK} \end{bmatrix} \qquad \text{Eqn. (16)}$$

Referring to the eligibility matrix of Equation (16), one configuration can be the following: if SE_n,k is eligible to use OTR-n, then $e_{n,k}=1$; if SE_n,k is not eligible, $e_{n,k}=0$.

The initialization operations at 504 can also include initializing the reserved bandwidths, maximum bandwidths, and minimum bandwidths, for each NRSC, for each of the K SEs that are designated or enabled for that NRSC. FIG. 5 illustrates the operations at 504 also setting initial values for CE,n,k, and CC(n). These initializing operations may be done locally at the NRSCs, by their respective BW allocation controllers, and therefore omitted at the NRSC BW manager. The flow 500 can proceed from 504 to 506, where the BW manager 402 (or another system 400 resource) can provide, to each $n^{th}$ of the N NRSC BW allocation controllers 406, the reserve bandwidth (CR_n,k), maximum bandwidth (CEmax_n,k), and minimum bandwidth (CEmin_n,k), if any, for each of the first priority users SE enabled to access that controller 406. Operations at 506 can include, for example, loading the first NRSC BW allocation controller 406-1 with CR_1,k, CEmax_1,k, CEmin_1,k, by K iterations, then loading a second NRSC BW allocation controller (not visible in FIG. 4), and continuing until the Nth NRSC BW allocation controller 406-N is loaded. Upon completion of 506, the N independent NRSC bandwidth allocation operations, can begin, for example, at a corresponding one of the N NRSC BW allocation controllers 406. In addition, each can be in accordance with the FIG. 2 flow 200.

The flow 500, by communications represented by logic block 508, can receive certain information regarding the state of the N NRSC, for example by the BW manager 402 performing an active query of the N NRSC BW allocation controllers 406, or by receiving periodic reports from the controllers 406. The information can include VR_n,k(t), CNRT_n, H_n,k(t), and H_N,K(T). The flow 500 can proceed from 508 to 510 and perform, by operations at the BW manager 402, an update of SE bandwidth parameters used by the NRSC BW allocation controllers 406 in allocating bandwidth, namely, CR_n,k, CEmax_n,k, and CEmin_n,k, n=1 to N, k=1 to K. When complete, the BW manager 402 can effectuate updates at the NRSCs by returning to 506, where it can send the updates of CR_n,k, CEmax_n,k, and CEmin_n,k, n=1 to N and k=1 to K, to the NRSC BW allocation controllers 406.

As will be understood, features provided by operation of the flow 500 can include, but are not limited to:

During intervals where an NRSC-n utilization is low, CR_n,k, CEmax_n,k for SE_n,k, k=1 to K, can be in proportion to the total plan rate, total plan rate, H_n,k, of SE_n,k.

During intervals where an NRSC-n utilization is relatively high, CR_n,k, and CEmax_n,k for SE_n,k, k=1 to K, can be in proportion to the SE's total active plan rate, h_n,k.

By dynamically providing CR (SE reserved bandwidths) and CEmax (SE maximum bandwidths), for each SE according to these features, the BW manager 402 can drive multi-NRSC bandwidth sharing for each SE, using NRSC bandwidth allocation processes independently run by each of the NRSC BW allocation controllers 406.

Additional features can include:

CEmin_n,k can be consistent across all NRSCs, while the proportion may be unnecessary.

During intervals where few SEs are actively transmitting, default reserved bandwidth can be used for all NRSCs.

Referring to FIG. 5, at block 508, the N NRSC BW allocation controllers 406 can send to the BW manager 402, for every SE enabled on each NRSC-n, a total plan rate, H_n,k, and an active plan rate h_n,k, n=1 to N and k=1 to K, each in kilobits per second (kbps) or megabits per second (Mbps). Concurrently or sequentially in time with sending H_n,k and h_n,k, to the BW manager 402, the N NRSC BW allocation controllers 406 can send the manager 402 updated values for each respective NRSC's total estimated capacity, CNRT_n, for n=1 to N, and average utilization UL_n. The updating period for these values can be multiples of the flow control interval, t, that is applied by the NRSC BW allocation controllers 406. To fit the updating interval, the values H_n,k, h_n,k, CNRT_n, and UL_n can be averaged. The averaging operations can be performed at the NRSC BW allocation controllers 406. For example, the total plan rate H_n,k and active plan rate h_n,k, can be averaged according to Equations (17) and (18):

$$EMA[(H\_n,k)(t+1)=\alpha 1 \cdot H\_n,k(t+1)+(1-\alpha 1)EMA(H\_n,k)(t) \quad \text{Eqn. (17)}$$

$$EMA[(h\_n,k)(t+1)=\alpha 1 \cdot h\_n,k(t+1)+(1-\alpha 1)EMA(h\_n,k)(t) \quad \text{Eqn. (18)}$$

where $\alpha 1$ is the smoothing factor.

Likewise, CNRT_n, and UL_n can be averaged according to Equations (19) and (20):

$$EMA[(CNRT\_n)(t+1)=\alpha 2 \cdot CNRT\_n(t+1)+(1-\alpha 2)EMA(CNRT\_n)(t) \quad \text{Eqn. (19)}$$

$$EMA[(UL\_n)(t+1)=\alpha 2 \cdot UL\_n(t+1)+(1-\alpha 2)EMA(UL\_n)(t) \quad \text{Eqn. (20)}$$

where $\alpha 2$ is the smoothing factor.

Preferably, each OTR partitioning controller 406 send all averaged values, or all non-averaged values, as opposed to a mixing of the two.

With the updated information described above, the BW manager 402, during its operations at FIG. 5 block 510, can generate the updated CR_n,k and CEmax_n,k values by operations according to Equations (21)-(25), or equivalents thereof.

$$ULA\_k = \frac{\sum_{n=1}^{N}(en,k \cdot UL\_n \cdot CNRT\_n)}{\sum_{n=1}^{N}(en,k \cdot CNRT\_n)} \quad \text{Eqn. (21)}$$

$$V\_k = \begin{cases} 0 & ULA\_k \leq UT1 \\ \frac{ULA\_k - UT1}{UT2 - UT1} & UT1 < ULA\_k \leq UT2 \\ 1 & ULA\_k > UT2 \end{cases} \quad \text{Eqn. (22)}$$

$$W\_nk = \frac{H\_nk}{\sum_{n=1}^{N}(eik \cdot H\_ik)}(1-V\_k) + \frac{h\_nk}{\sum_{n=1}^{N}(eik \cdot h\_ik)} \cdot V\_k \quad \text{Eqn. (23)}$$

$$CR\_n, k = \max\{CEmin\_k, \min[W\_nk \cdot CR\_k, \beta\_upper \cdot CNRT\_n)], \quad \text{Eqn. (24)}$$

where $\beta\_upper$ is the upper limit of the portion of an NRSC's capacity being used for an SE user.

$$CEmax\_n,k=\max\{CEmin\_k,\min[W\_nk \cdot CEmax\_k, \beta\_upper \cdot CNRT\_n)] \quad \text{Eqn. (25)}$$

Exemplary systems and methods above, and features and aspects thereof provide, as described, a dynamic allocation and sharing of NRSC capacity, with efficient maximized utilization of that capacity, to K first priority users, SE_k, k=1 to K. As also described above, one or more of such first priority users SE can be a group of users, for example, multiple Virtual Network Operators (VNOs), aggregated as an SE to be allocated NRSC bandwidth in accordance with the features and aspects of the present disclosure. In a multi-tiered aspect, NRSC bandwidth assigned to such an SE can then, through subscriptions or other arrangements that presently disclosed systems and methods need have no knowledge, be dynamically shared by and allocated among the multiple VNOs aggregated as an SE.

According to an aspect, one or more multi-tiered systems and methods can be implemented, that can provide a group of VNOs with allocation of NRSC bandwidth, e.g., by operations according to the flow 200 or the flow 500, in combination with dynamic sharing and allocation of that NRSC bandwidth amongst the multiple VNOs or other sub-groups, by operations independent from the flows 200 and 500, but furthering the utilization of those flows, as well as the systems and methods applied in the second tier allocation. One example of such a combination of systems and methods can be implemented as a multi-tiered system or method, including a system or method according to the present disclosure, which can efficiently allocate NRSC bandwidth to an aggregate of VNOs or other sub-groups, and feeding that allocated bandwidth to a system or method such as, for example, those disclosed by U.S. Pat. App. Pub. No. 2016/0072574, filed Sep. 8, 2014, (the '574 publication) the entirety of which is hereby incorporated by reference. Such methods and systems can then, in tandem with the present disclosure, divide and allocate the aggregated NRSC bandwidth among its constituent VNOs, according to their respective bandwidth guarantees.

Technical features of multi-tiered systems and methods according to this aspect include aggregation of demands of multiple subgroups, e.g., multiple VNOs, into a single first priority user, with dynamic, efficient allocation of NRSC bandwidth to that aggregate first priority user, e.g., according to the FIG. 2 flow 200 or FIG. 5 flow 500, coupled with feeding that bandwidth to systems and processes according to the '574 publication, for independent second-tier allocation among the multiple subgroups (e.g., VNOs), based on their respective bandwidth commitments (peak and guarantees), as well as their respective demands.

In another aspect, systems and methods according to the present disclosure can be adapted and implemented to provide bandwidth commitment to first priority users not only within the same resource, e.g., network resources as illustrated in FIG. 1, but also across multiple distinct resources, for example, but not limited to, multiple beams, multiple gateways, and multiple satellite networks. One or more examples of such systems and methods can include allocation of bandwidth of one or more NRSCs, among SEs, in accordance with systems and processes as described above, e.g., in reference to FIGS. 1-5, in combination with another, longer cycle time operation, e.g., by another central bandwidth manager logic (not explicitly visible in FIGS. 1-5). In one or more implementations, such longer cycle time operations can be in accordance with systems and methods disclosed in U.S. application Ser. No. 15/371,490, titled "Distribution of a Virtual Network Operator Subscription in a Satellite Spot Beam Network," (the '490 application"), and incorporating by reference U.S. Provisional Application Ser. No. 62/426,592 ("the '592 application") for "Distribution of a Virtual Network Operator Subscription in a Satellite Spot Beam Network," filed Nov. 27, 2016, wherein the entirety of the '490 application and its incorporated '592 application are hereby incorporated by reference.

In one or more implementations, exemplary longer cycle time operations can include operations such as described in the '490 application, e.g., in reference to the '490 FIG. 4 process block 420. In one general example, such operations can include receiving (e.g., by operations such as described in reference to the '490 FIG. 4 block 422), average demands on each NRSC in which the first priority user operates, (e.g., sent by the present disclosure's FIG. 1 NRSC BW allocation controllers 110, or by two or more of the present disclosure's FIG. 4 bandwidth managers 402). The longer loop central bandwidth manager logic can then, in an aspect, aggregate the overall allocations for each first priority user against a larger configured guaranteed and maximum bandwidth for that first priority user. In an implementation, the longer loop central bandwidth manager logic can determine, based on that aggregation and comparison to the larger configured and guaranteed and maximum bandwidth for that first priority user, an adjustment (up/down) to the guarantee and to the maximum bandwidth for that first priority user, in each NRSC in which that first priority user operates. In implementations according to this aspect, such adjustments can be a function of, or can be based on, for example, of demand per NRSC, allocations per NRSC, utilization per NRSC, and commitments to that first priority user, and other first priority users in each NRSC. In one or more such implementations, the longer loop central bandwidth manager logic can then feed the adjusted guarantee and maximum bandwidth for that first priority user back to each NRSC, for the NRSC to utilize, instead of a hard-coded set that may be run in operations as described herein, for example, in reference to the present disclosure's FIGS. 2 and 5.

Technical features of the above-described combination of the present disclosure's NRSC bandwidth allocation and sharing aspects, with a longer loop adjustment such as disclosed in the '490 application, can include a central aggregating bandwidth manager logic increasing or decreasing the amount of bandwidth that a first priority user can be allocated in a given NRSC, in order to additionally ensure that a larger, aggregate bandwidth guarantee for that first priority user can be adequately met over time.

It will be understood that implementations of the above-described combination of NRSC bandwidth allocation and sharing, in accordance with the present disclosure's FIGS. 1-5, with a longer loop adjustment, such as disclosed in the '490 application, of allocation among multiple distinct NRSCs that are available to a first priority user, can be done for each first priority user, e.g., for each SE_k, k=1 to K. In addition, it will be understood that this combination of NRSC bandwidth allocation and sharing, and a longer loop adjustment of each first priority user's allocation within multiple distinct NRSCs, can be further combined with a multi-tiered implementation as described above.

Figure 6:
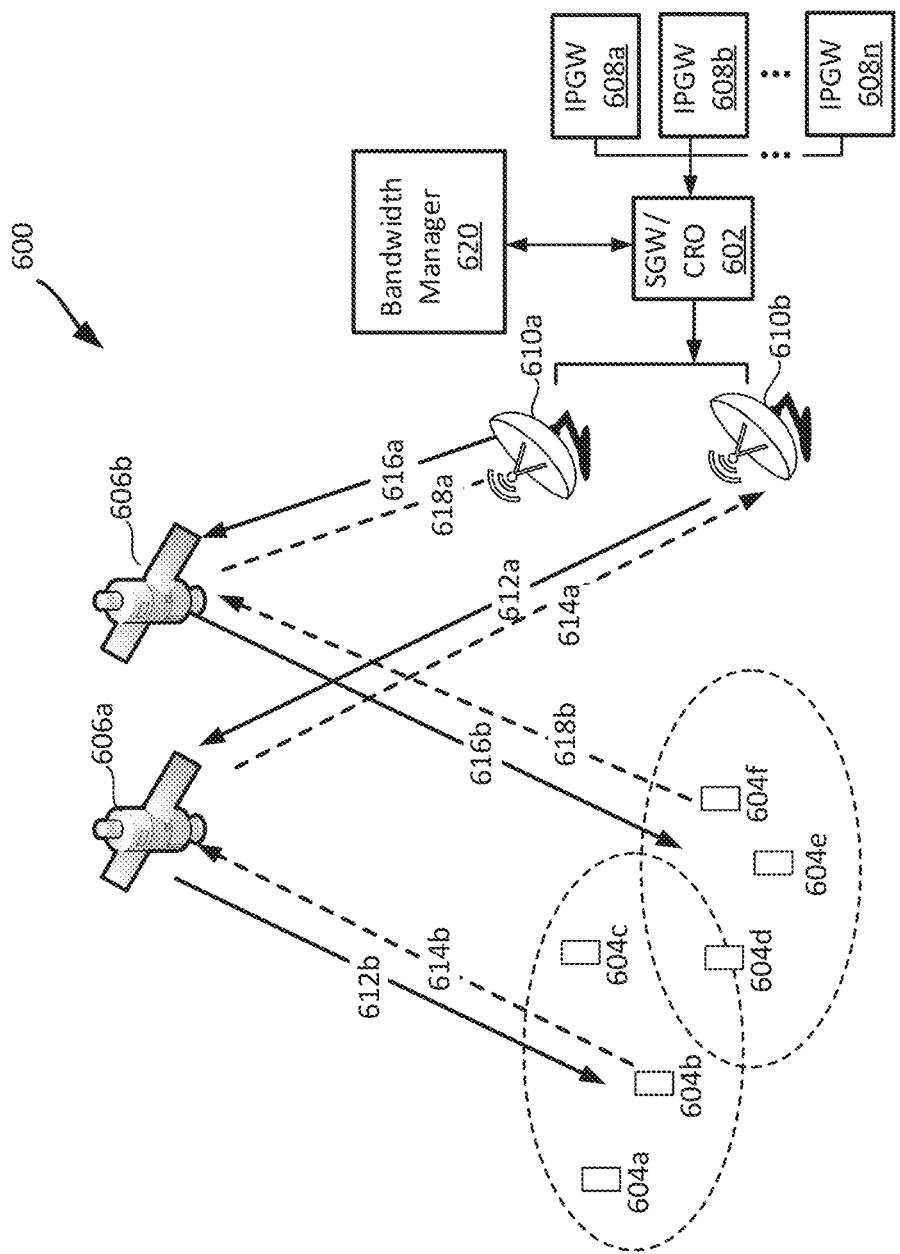
FIG. 6 illustrates an example satellite system in which aspects of this disclosure may be implemented.

FIG. 6 illustrates an example of a satellite network 600 in which various aspects of the present disclosure may be implemented. The satellite network 600 can include an SGW 602, remote terminals 604a-604f, two satellites 606a and 606b, IPGWs 608a-608n, and RF terminals 610a and 610b.

SGW 602 may be connected to remote terminals, such as the example VSATs 604a-604f via satellites 606a and 606b. Forward uplinks 612a and 616a may carry data between SGW 602 and satellites 606a and 606b, respectively. Each of one or more of the VSATs 604a-604f can be associated with a respective network user who has been assigned (e.g., via subscription) a first priority access for sending dataReturn downlinks 614a and 618a can provide for transmitting data from satellites 606a and 606b, respectively, to SGW 602. Forward uplinks 612a, 616a and forward downlinks 612b, 616b may form an outroute, and the outroute can be an example NRSC having its current capacity shared and allocated among first priority user an NRSC), and return uplinks 614b, 618b and return downlinks 614a, 618a may form an inroute. SGW 602 may be part of satellite earth stations with connectivity to ground telecommunications infrastructure. RF terminals 610a and 610b may be the physical equipment responsible for sending and receiving signals to and from satellites 606a and 606b, respectively, and may provide air interfaces for SGW 602.

Satellites 606a and 606b may be any suitable communications satellites. Signals through satellites 606a and/or 606b in the forward direction may, for example, be according to the DVB-S2x standard. Signals passing through satellites 606a and/or 606b in the return direction may be based, for example, on the IPoS standard. Other suitable signal types may also be used in either direction.

The bandwidth of RF terminals 610a and 610b can be shared amongst IPGWs 608a-608n. At each of IPGWs 608a-608n, RT and NRT traffic flows may be classified into different priorities, and may be processed and multiplexed before being forwarded to priority queues at SGW 602. Data from an internet intended for remote terminals 604a-604f (e.g., VSATs) may be in the form of IP packets, including TCP packets and UDP packets, or any other suitable IP packets. This data may enter SGW 602 from any one of IPGWs 608 a-608 n. The received IP packets may be processed and multiplexed by SGW 602 along with IP packets from the other ones of IPGWs 608a-608n. The IP packets may then be transmitted to satellites 606a and/or 606b, and satellites 606a and/or 606b may then transmit the IP packets to the VSATs. Similarly, IP packets may enter the network via the VSATs, be processed by the VSATs, and transmitted to satellites 606a and/or 606b. Satellites 606a and/or 606b may then send these inroute IP packets to SGW 602. It should be noted that because the spectrum can be segmented for one beam, a particular satellite beam can carry one or multiple NRSCs In various embodiments, a bandwidth manager 620 can be included to manage or coordinate bandwidth allocation on the shared network. Bandwidth manager 620 may be implemented, for example, as a centralized bandwidth manager configured to allocate available bandwidth among the various terminals. The bandwidth manager 620 can also be configured in accordance with the BW manager 402 described above. The bandwidth manager 620 can therefore be configured to interface with SGW 602 to receive information about traffic flows in the network, including the FIG. 5 block 508 reception of VR_n,k(t), CNRT_n, H_n,k(t), and H_N,K(T), for n=1 to 2. The bandwidth manager 620 can also provide control messages, including the FIG. 5 block 506 updated CR_n,k and CEmax_n,k values, to the NRSCs.

Figure 7:
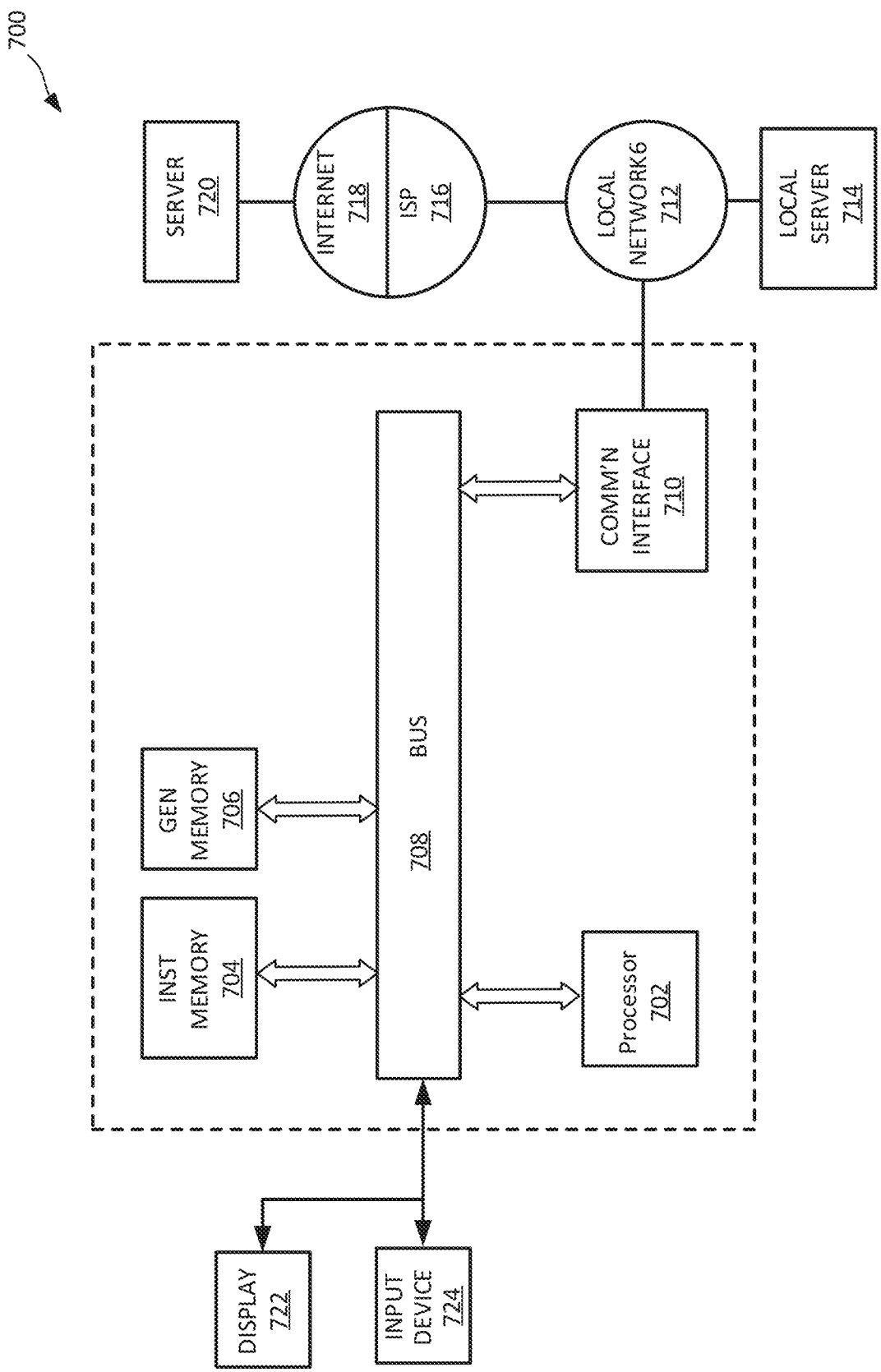
FIG. 7 illustrates a functional block diagram of an example computer system upon which aspects of this disclosure may be implemented.

FIG. 7 is a block diagram illustrating a computer system 700 upon which aspects of this disclosure may be implemented, such as, but not limited to, particular logic blocks described in reference to FIG. 1. It will be understood that logic blocks illustrated in FIG. 7 represent functions, and do not necessarily correspond to particular hardware on a one-to-one basis. The computer system 700 can include a data processor 702, an instruction memory 704, and a general-purpose memory 706, coupled by a bus 708.

The instruction memory 704 can include a tangible medium retrievably storing computer-readable instructions, that when executed by the data processor 702 cause the processor to perform operations, such as described in reference to FIGS. 1, 3, 4, and 5.

The computer system 700 can also include a communications interface 710, configured to interface with a local network 712 for accessing a local server 714, and to communicate through an Internet service provider (ISP) 716 to the Internet 718, and access a remote server 720. The computer system 700 can also include a display 722 and a user interface 724, such as a touchscreen or keypad.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracing of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that terms and expressions used herein have the ordinary meaning accorded to such terms and expressions in their respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

In the foregoing Detailed Description, it can be seen that various features are grouped together in various examples for the purpose of streamlining the disclosure. This method of disclosure is not to be interpreted as reflecting an intention that any summary recitation requires more features than its expressly recites. The following summary paragraphs form a portion of this disclosure.

What is claimed:

1. A system for prioritized bandwidth allocation and sharing of a network resource, comprising:
   a network resource bandwidth allocation controller, configured to allocate network resource bandwidth, and including a programmable processor and an instruction memory coupled by a bus to the programmable processor, the instruction memory storing executable instructions that, when executed by the programmable processor, cause the programmable processor to:
      obtain a delay level of the network resource, the delay level being a time delay, receive a first priority user's guaranteed bandwidth,
determine a first priority user's demand requests for the network resource and determine a second priority user's demand requests for the network resource, priority of the first priority user being higher than priority of the second priority user,
determine a total traffic on the network resource, determine a utilization level of the network resource based at least in part on the total traffic on the network resource in combination with a network resource capacity,
determine a network resource state, based at least in part on the delay level of the network resource, from among a plurality of different network resource states, wherein determining the network resource state includes determining the network resource state as a congestion state among a plurality of different congestion states, each of the different congestion states being based at least in part on the delay level and the utilization level, wherein determining the network resource state is further based on the utilization level,
upon the network resource state meeting a condition, to adjust a current allocation of the network resource bandwidth to the first priority user to an adjusted allocation of the network resource bandwidth to the first priority user, the adjusting being based at least in part on a combination of the current allocation of the network resource bandwidth to the first priority user, the first priority user's demand requests for the network resource, the second priority user's demand requests for the network resource, the first priority user's guaranteed bandwidth, and the capacity of the network resource, and the condition includes at least one of the congestion states,
adjust a current allocation of the network resource bandwidth to the second priority user, based at least in part on the adjusted allocation of the network resource bandwidth to the first priority user, wherein:
the plurality of different congestion states includes a non-congested state and a delay level congested state,
wherein the determining the network resource state includes:
determine the congestion state as the non-congested state upon the delay level of the network resource being less than a given delay threshold, concurrent with the utilization level being less than a given utilization threshold, and
determine the congestion state as the delay level congested state upon the delay level being greater than the given delay threshold, and
the adjusting the first priority user's current allocation of the network resource bandwidth includes increasing the first priority user's current allocation of the network resource bandwidth upon the congestion state being the non-congested state.

2. The system of claim 1, wherein:
the adjusting of the current allocation of the network resource bandwidth to the first priority user is further based on a maximum bandwidth associated with the first priority user.

3. The system of claim 1, wherein:
the first priority user is a first priority user among a plurality of first priority users, and the executable instructions further include executable instructions that when executed by the programmable processor cause the programmable processor to:
access, for each of the first priority users, the first priority user's current allocation of the network resource bandwidth, the first priority user's guaranteed bandwidth, and a maximum bandwidth associated with the first priority user,
determine, for each of the first priority users, the first priority user's demand requests for the network resource, and
upon the network resource state meeting the condition, to:
adjust each of the first priority user's current allocation of the network resource bandwidth to be the first priority user's adjusted allocation of the network resource bandwidth, based at least in part on a combination of the first priority user's current allocation of the network resource bandwidth, the first priority user's demand requests for the network resource, the second priority user's demand requests for the network resource, the first priority user's guaranteed bandwidth, and the capacity of the network resource.

4. The system of claim 3, wherein:
the plurality of first priority users includes K first priority users, K being a positive integer, and
the network resource bandwidth allocation controller is a first network resource bandwidth allocation controller among N network resource bandwidth allocation controllers, each $n^{th}$ N network resource bandwidth allocation controller being associated with a corresponding one of N gateways, N being a positive integer, each $n^{th}$ gateway being to a corresponding one of N network resources,
each $n^{th}$ N network resource bandwidth allocation controller includes a programmable processor and an instruction memory coupled to the programmable processor by a bus, the instruction memory storing executable instructions that, when executed by the programmable processor, cause the programmable processor to allocate a bandwidth of the $n^{th}$ network resource bandwidth allocation controller's corresponding $n^{th}$ network resource, to a corresponding population of K first priority users, and to a corresponding second priority user, wherein the allocating the corresponding $n^{th}$ network resource bandwidth includes:
receiving K first priority reserved bandwidths (CR_n,k) and K first priority maximum bandwidths (CM_n,k), each CR_n,k and each CM_n,k corresponding to the $k^{th}$ of the K first priority users,
obtaining a network resource delay level (DL_n) and a network resource utilization level (UL_n) of the $n^{th}$ network resource bandwidth allocation controller's corresponding network resource,
determining a congestion state of the $n^{th}$ network resource bandwidth allocation controller's corresponding $n^{th}$ network resource, based at least in part on DL_n and UL_n,
conditionally updating, at time t, based at least in part on the congestion state of the $n^{th}$ network resource bandwidth allocation controller's corresponding nth network resource, a current allocation of network resource bandwidth, CE_n,k(t), for each of the $n^{th}$ network resource bandwidth allocation controller's K first priority users, to CE_n,k(t+1), and upon updating CE_n,k(t) to CE_n,k(t+1), for k from 1 to K, updating a current allocation of network resource bandwidth to the $n^{th}$ network resource bandwidth allocation controller's second priority user, based at least in part on a summation of CE_n,k(t+1), for k from 1 to K.

5. The system of claim 4, wherein the system further includes a bandwidth manager, the bandwidth manager being configured to:
  select, for each $n^{th}$ N network resource bandwidth allocation controller, the $n^{th}$ network resource bandwidth allocation controller's population of K first priority users, and
  provide, to each nth N network resource bandwidth allocation controllers, CM_n,k, and CR_n,k, for k from 1 to K.

6. The system of claim 1, wherein: the plurality of different congestion states further includes a first intermediate congestion state and a second intermediate congestion state,
  wherein the determining the network resource state is further configured to:
    determine the congestion state as the first intermediate congestion state upon the delay level being less than the given delay threshold, concurrent with the utilization level being less than a first utilization threshold, and
    determine the congestion state as the second intermediate congestion state upon the delay level being less than the given delay threshold, concurrent with the utilization level being concurrently greater than the first utilization threshold and less than a second utilization threshold, and
  wherein the adjusting the first priority user's current allocation of the network resource bandwidth further includes:
    increasing the first priority user's current allocation of the network resource bandwidth upon determining the congestion state as the first intermediate congestion state, and
    decreasing the first priority user's current allocation of the network resource bandwidth upon determining the congestion state as the second intermediate congestion state.

7. The system of claim 1, wherein the first priority user is a first priority user among a plurality of first priority users, and wherein the system further includes:
  a second tier bandwidth allocation sub-system, associated with the first priority user, configured to dynamically allocate the network resource bandwidth between and among each of a first group of sub-users of the first priority user's allocated bandwidth, in accordance with respective guarantees to members of the first group of sub-users, and
  another second tier bandwidth allocation sub-system, associated with another first priority user among the plurality of first priority users, configured to dynamically allocate the network resource bandwidth between and among each of a second group of sub-users of the another first priority user's allocated bandwidth, in accordance with respective guarantees to members of the second group of sub-users,
  wherein
    the second tier bandwidth allocation sub-system associated with the first priority user and the another second tier bandwidth allocation sub-system associated with the another first priority user are configured to each operate mutually independent from one another, and mutually independent from the network resource bandwidth allocation controller.

8. The system of claim 7, wherein the network resource is a first network resource and the network resource bandwidth allocation controller is a first network resource bandwidth controller, and wherein the system further includes:
  a second network resource;
  a second network resource bandwidth controller, associated with the second network resource; and
  central network resource allocation manager, the central network resource allocation manager being configured to:
    receive, from the first network resource bandwidth controller, an average of demand requests on the first network resource by a given one of the plurality of first priority users and an allocated bandwidth on the first network resource for the given one of the plurality of first priority users,
    receive, from the second network resource bandwidth controller, an average of demand requests on the second network resource by the given one of the plurality of first priority users and an allocated bandwidth on the second network resource for the given one of the first priority users,
    aggregate the allocated bandwidth on the first network resource and the allocated bandwidth on the second network resource, for the given one of the plurality of first priority users, to an aggregate allocated bandwidth, and compare said aggregate allocated bandwidth against a larger configured guaranteed bandwidth and maximum bandwidth for the given one of the plurality of first priority users,
    determine an adjustment of the configured guaranteed bandwidth and of the maximum bandwidth for the given one of the plurality of first priority users on each of the first and second network resources, based at least in part on said aggregate allocated bandwidth and the comparison to the larger configured guaranteed bandwidth and maximum bandwidth for the given one of the plurality of first priority users, and
    feed the adjustment of the guaranteed bandwidth and of the maximum bandwidth for the given one of the plurality of first priority users to the first network resource bandwidth allocation controller and to the second network resource bandwidth allocation controller.

9. A method for prioritized bandwidth allocation and sharing of a network resource, comprising:
  determining a network resource state, based at least in part on a delay level of the network resource, the delay level being a time delay,
  determining a total traffic on the network resource; and
  the total traffic on the network resource in combination with a capacity of the network resource, wherein the determining the network resource state is further based on the utilization level,
  wherein the network resource state includes a congestion state, from among a plurality of different congestion states, each of the different congestion states being based at least in part on the delay level and the utilization level,
  determining a first priority user's demand requests for the network resource and a second priority user's demand requests for the network resource, priority of the first priority user being higher than priority of the second priority user, upon the network resource state meeting a condition,
adjusting an allocation of network resource bandwidth to the first priority user, based at least in part on a combination of the first priority user's demand requests for the network resource, the second priority user's demand requests for the network resource, a guaranteed bandwidth for the first priority user, and a capacity of the network resource, and
based at least in part on adjusting the allocation of the network resource bandwidth to the first priority user, adjusting an allocation of the network resource bandwidth to the second priority user
wherein the plurality of different congestion states includes a non-congested state and a delay level congested state, the determining the network resource state includes:
determining the non-congested state upon the delay level being less than a given delay threshold, concurrent with the utilization level being less than a given utilization threshold,
determining the delay level congested state upon the delay level being greater than the given delay threshold, and
adjusting the allocation of the network resource bandwidth to each of the first priority users includes increasing the first priority user's current bandwidth allocation upon the congestion state being the non-congested state.

10. The method of claim 9, wherein:
the adjusting the allocation of the network resource bandwidth to the first priority user is further based on a maximum bandwidth for the first priority user.

11. The method of claim 9, wherein the first priority user is a first priority user among a plurality of first priority users, and wherein the method further includes:
determining, for each of the first priority users, the first priority user's demand request for the network resource, and
upon the network resource state meeting the condition,
adjusting the allocation of the network resource bandwidth to each of the first priority users, each adjusting based, at least in part, on the first priority user's current bandwidth allocation, the first priority user's guaranteed bandwidth, and a maximum bandwidth for the first priority user,
wherein
the adjusting the allocation of the network resource bandwidth to the second priority user is further based at least in part on adjusting the allocation of the network resource bandwidth to each of the first priority users.

12. The method of claim 11, wherein:
the plurality of different congestion states further includes a first intermediate congestion state and a second intermediate congestion state,
the determining the network resource state further includes:
determining the first intermediate congestion state upon condition the delay level being less than the given delay threshold, concurrent with the utilization level being less than a first utilization threshold, and
determining the second intermediate congestion state upon the delay level being less than the given delay threshold, concurrent with a concurrency of the utilization level being greater than the first utilization threshold concurrent and less than a second utilization threshold, and
the adjusting the allocation of the network resource bandwidth to each of the first priority users further includes:
increasing the allocation of bandwidth to each first priority user upon determining the first intermediate congestion state, and
decreasing the allocation of bandwidth to each first priority user upon determining the second intermediate congestion state.

13. The method of claim 12, wherein:
the plurality of priority users includes K first priority users, K being a positive integer,
the network resource is a first network resource among N network resources, N being a positive integer, and
wherein the method further includes:
for each nth of the N network resources, allocating a bandwidth of the $n^{th}$ network resource, to a corresponding $n^{th}$ population of K first priority users, and for a second priority user, the allocating including:
providing, to a corresponding controller of each nth network resource, K first priority reserved bandwidths (CR_n,k) and K first priority maximum bandwidths (CM_n,k), each CR_n,k and each CM_n,k corresponding to one of the $n^{th}$ network resource's K first priority users,
periodically determining a congestion state of each $n^{th}$ network resource, based at least in part on an $n^{th}$ network resource delay level (DL_n) and nth network resource utilization level (UL_n),
for each $n^{th}$ network resource, conditional on the $n^{th}$ network resource's congestion state, adjusting a first priority bandwidth allocation CE_n,k(t) for the network resource's K first priority users, to CE_n,k(t+1), each adjusting being based, at least in part, on the $n^{th}$ network resource's K first priority reserved bandwidths (CR_n,k) and the $n^{th}$ network resource's K first priority maximum bandwidths (CM_n,k), and
upon updating CE_n,k(t), for k from 1 to K, updating a second priority bandwidth allocation to each $n^{th}$ network resource's second priority user, based at least in part on a summation of CE_n,k(t+1), for k from 1 to K.

* * * * *